(12) United States Patent
Shin et al.

(10) Patent No.: US 9,497,271 B2
(45) Date of Patent: Nov. 15, 2016

(54) METHOD, STORAGE MEDIUM, AND APPARATUS FOR PERFORMING PEER TO PEER SERVICE BY USING CONTACTS INFORMATION

(71) Applicant: Samsung Electronics Co., Ltd., Gyeonggi-do (KR)

(72) Inventors: In-Young Shin, Seoul (KR); Jun-Hyung Kim, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 188 days.

(21) Appl. No.: 14/251,168

(22) Filed: Apr. 11, 2014

(65) Prior Publication Data
US 2015/0149644 A1 May 28, 2015

(30) Foreign Application Priority Data

Nov. 26, 2013 (KR) .......................... 10-2013-0144196

(51) Int. Cl.
*G06F 15/16* (2006.01)
*H04L 29/08* (2006.01)

(52) U.S. Cl.
CPC ........... H04L 67/14 (2013.01); H04L 67/1093 (2013.01)

(58) Field of Classification Search
CPC ...................... H04L 67/1093; H04L 67/14
See application file for complete search history.

(56) References Cited

U.S. PATENT DOCUMENTS

| | | | | |
|---|---|---|---|---|
| 7,945,689 B2 * | 5/2011 | Painter | ............... | H04N 7/17318 709/203 |
| 2005/0220076 A1 * | 10/2005 | Kokado | ............. | H04L 12/2854 370/351 |
| 2006/0053289 A1 * | 3/2006 | Singh | .................... | H04L 9/3273 713/169 |
| 2006/0067249 A1 * | 3/2006 | Poustchi | ............. | H04L 67/1068 370/260 |
| 2012/0136949 A1 * | 5/2012 | Virani | ................... | H04L 12/582 709/206 |
| 2012/0195263 A1 | 8/2012 | Chandra et al. | | |
| 2013/0223341 A1 | 8/2013 | Kim et al. | | |
| 2014/0179229 A1 * | 6/2014 | Lin | ....................... | H04W 8/005 455/41.2 |
| 2014/0219453 A1 * | 8/2014 | Neafsey | ............... | H04B 5/0056 380/270 |

FOREIGN PATENT DOCUMENTS

| | | | |
|---|---|---|---|
| EP | 1843543 A1 * | 10/2007 | ......... H04L 63/0807 |
| EP | 2 302 883 | 3/2011 | |
| KR | 1020080006881 | 1/2008 | |
| WO | WO 2013/119094 | 8/2013 | |

\* cited by examiner

*Primary Examiner* — Mohamed Wasel
(74) *Attorney, Agent, or Firm* — The Farrell Law Firm, P.C.

(57) ABSTRACT

A method of performing a Peer to Peer (P2P) service with at least one second terminal by a first terminal is provided. The method includes transmitting contact information of the first terminal to the at least one second terminals; receiving contact information of the at least one second terminals from the at least one second terminal; receiving information on an application supporting the P2P service from the at least one second terminal; displaying identification information of the at least one second terminal and first identification information of the application by using the contact information of the at least one second terminal and the information on the application; and performing the P2P service with the at least one second terminal through the application.

17 Claims, 11 Drawing Sheets

METHOD, STORAGE MEDIUM, AND APPARATUS FOR PERFORMING PEER TO PEER SERVICE BY USING CONTACTS INFORMATION

PRIORITY

This application claims priority under 35 U.S.C. §119(a) to Korean Application Serial No. 10-2013-0144196 which was filed in the Korean Intellectual Property Office on Nov. 26, 2013, the entire content of which is incorporated herein by reference.

BACKGROUND

1. Field of the Invention

The present invention generally relates to a Peer to Peer (P2P) service, and more particularly, to a method of performing a P2P service by recognizing an electronic device of an acquaintance.

2. Description of the Related Art

In general, a Peer to Peer (P2P) service refers to a service in which two terminals configure a network in a one-to-one correspondence to communicate with each other. For example, in the P2P service, two terminals, such as smart phones, a notebook computer and a mouse, and a tablet Personal Computer (PC) and a printer, directly configure the network.

Based on an assumption that a Wi-Fi Direct service of the P2P service is used, a user sequentially selects a setting menu, a Wi-Fi menu, and a Wi-Fi Direct menu of the terminal. The terminal of the user searches for neighboring counterpart terminals supporting the Wi-Fi Direct service and shows identifiers of the counterpart terminals to the user. The identifier of the counterpart terminal may be a model name of the counterpart terminal, such as SHV-E21OS or Android-99 set by a manufacturer of the counterpart terminal.

When a user desires to perform a P2P service with a counterpart terminal owned by an acquaintance, the user is required to know a model name of the counterpart terminal. However, the user has a difficulty in recognizing the counterpart terminal owned by the acquaintance through the model name. Further, when there are a plurality of counterpart terminals having the same model name around the user, it becomes more difficult to recognize the terminal owned by the acquaintance.

SUMMARY

The present invention has been made to at least partially resolve, alleviate, or remove at least one of the problems and/or disadvantages associated with the prior art, and to provide at least the advantages described below.

Accordingly, an aspect of the present invention provides a method in which the user may perform the P2P service by easily recognizing an electronic device of an acquaintance.

Another aspect of the present invention provides a method in which the user may perform the P2P service through an intuitive User Interface (UI).

In accordance with an aspect of the present invention, a method of performing a Peer to Peer (P2P) service with at least one second terminal by a first terminal is provided. The method includes transmitting contacts information of the first terminal to at least one second terminal; receiving contacts information of at least one second terminal from the at least one second terminal; receiving information on an application supporting the P2P service from at least one second terminal; displaying identification information of the at least one second terminal and first identification information of the application by using the contacts information of at least one second terminal and the information on the application; and performing the P2P service with the at least one second terminal through the application.

In accordance with another aspect of the present invention, a first terminal performing a Peer to Peer (P2P) service with at least one second terminal is provided. The first terminal includes a display unit; a memory that stores contacts information of the first terminal; a communication unit that directly performs wireless communication with at least one second terminal; and a controller that transmits the contacts information of the first terminal to the at least one second terminal through the communication unit, receives contacts information of the at least one second terminal from the at least one second terminal through the communication unit, receives information on an application supporting the P2P service from the at least one second terminal through the communication unit, displays identification information of the at least one second terminal and first identification information of the application on the display unit by using the contacts information of the at least one second terminal and the information on the application, and performs the P2P service with the at least one second terminal through the application.

In accordance with another aspect of the present invention, a second terminal performing a Peer to Peer (P2P) service with a first terminal is provided. The second terminal includes a display unit; a memory that stores contacts information of the second terminal; a communication unit that directly performs wireless communication with the first terminal; and a controller that receives contacts information of the first terminal from the first terminal through the communication unit, transmits the contacts information of the second terminal to the first terminal through the communication unit, transmits information on an application supporting the P2P service to the first terminal through the communication unit, and performs the P2P service with the first terminal through the application.

BRIEF DESCRIPTION OF THE DRAWINGS

The above and other aspects, features, and advantages of the present invention will be more apparent from the following detailed description taken in conjunction with the accompanying drawings, in which.

DETAILED DESCRIPTION OF EMBODIMENTS OF THE PRESENT INVENTION

Figure 1:
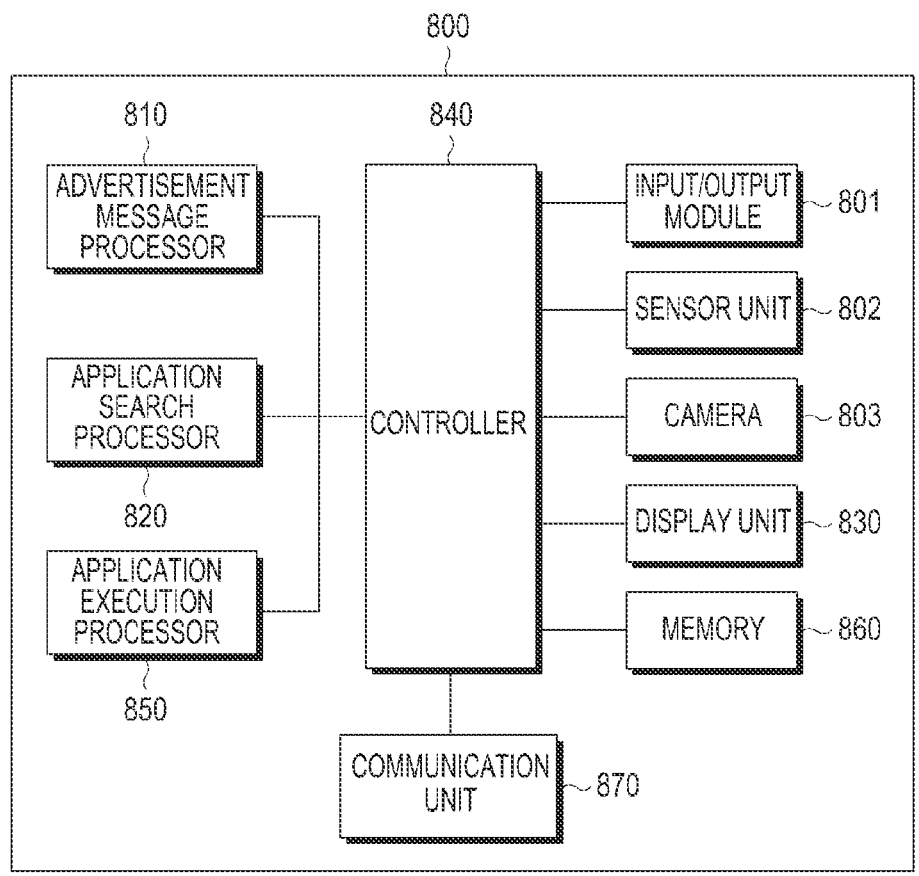
FIG. 1 illustrates a block diagram of a first terminal according to an embodiment of the present invention.

Various example embodiments will now be described more fully with reference to the accompanying drawings in which some example embodiments are shown. However, the embodiments do not limit the present invention to a specific implementation, but should be construed as including all modifications, equivalents, and replacements included in the spirit and scope of the present invention.

While terms including ordinal numbers, such as "first" and "second," etc., may be used to describe various components, such components are not limited by the above terms. The terms herein are used merely for the purpose of distinguishing one element from other elements. For example, a first component may be referred to as a second component and the second component may also be referred to as the first component without departing from the scope of the present invention. The term "and/or" includes a combination or one of items related to the plural.

The terms used in this application are for the purpose of describing particular embodiments only and are not intended to be limiting of the present invention. As used herein, the singular forms are intended to include the plural forms as well, unless the context clearly indicates otherwise. The terms such as "include" and/or "have" may be construed to denote a certain characteristic, number, step, operation, constituent element, component or a combination thereof, but may not be construed to exclude the existence of or a possibility of addition of at least one other characteristics, numbers, steps, operations, constituent elements, components or combinations thereof.

Unless defined otherwise, all terms including technical and scientific terms used herein have the same meaning as commonly understood by those skilled in the art. Such terms as those defined in a generally used dictionary are to be interpreted to have meanings equal to the contextual meanings in the relevant field of art, and are not to be interpreted to have ideal or excessively formal meanings unless clearly defined in the present specification.

In this specification, the terminal may refer to a portable terminal, a mobile terminal, a communication terminal, a portable communication terminal, a portable mobile terminal, a display device or the like.

For example, the terminal may be a smart phone, a mobile phone, a navigation device, a game machine, a TeleVision (TV), a notebook computer, a laptop computer, a tablet computer, a Personal Media Player (PMP), a Personal Digital Assistant (PDA) or the like. The terminal may be implemented as a portable communication terminal of a pocket size having a wireless communication function. Further, the terminal may be a flexible device or a flexible display device.

In this specification, the P2P service corresponds to a service in which a plurality of terminals directly configure the network without a relay device, such as an Access Point (AP), to perform wireless communication. In the P2P service, at least one terminal directly configures the network without a relay device to perform wireless communication.

The present invention provides a user with a user-friendly User Experience (UE) which can directly execute the P2P service in a service or application on a user terminal by using identification information easily recognized by the user, such as a phone number or an e-mail in order to avoid the problems in a conventional method of selecting a terminal through a device name.

Further, the user identifies whether a terminal stored in a contacts list of a user located within a local network has the same application as that installed in the user terminal and selects P2P service enabling application. When a counterpart terminal does not have an application for the P2P service installed, the user terminal and the counterpart terminal may perform the seamless P2P service through a method of downloading and executing a particular application.

FIG. 1 illustrates a representative configuration of a first terminal according to an embodiment of the present invention. Referring to FIG. 1, the first terminal 800 corresponding to a user terminal includes a first input/output module 801, a first sensor unit 802, a first camera 803, a first advertisement message processor 810, a first application search processor 820, a first display unit 830, a first controller 840, a first application execution processor 850, a first memory 860, and a first communication unit 870. The first input/output module 801 is a means for receiving a user input or informing the user of information and includes a plurality of buttons, a microphone, a speaker, a vibration motor, a connector, a keypad, a mouse, a trackball, a joystick, cursor direction keys, a cursor control, and the like. The buttons may be formed on a front surface, a side surface, and/or a rear surface of the first terminal 800, and includes a power/lock button, a volume button, a menu button, a home button, a back button, a search button, and the like. The connector may be used as an interface for connecting the first terminal 800 with a server, an external electronic device, or a power source. According to a control of the controller 840, data stored in the first memory 860 of the first terminal 800 may be transmitted to an external device or received from an external device through a wired cable connected to the connector. Power may be input from a power source or a battery may be charged through the wired cable connected to the connector. The keypad receives a key input from the user to control the first terminal 800. The keypad may include a physical keypad formed on the first terminal 800 or a virtual keypad displayed on the display unit 830.

The first sensor unit 802 may include at least one sensor that detects a state (position, direction, motion and the like) of the first terminal 800. For example, the first sensor unit 802 may include a proximity sensor that detects whether the user approaches to the first terminal 800 or a motion/direction sensor that detects an operation of the first terminal 800 (for example, rotation, acceleration, retardation, or vibration of the first terminal 800). Further, the motion/direction sensor may include an acceleration sensor (or gravity sensor) that measures a slope and detects a linear speed change, a gyro sensor that detects an angular speed, an impact sensor, a Global Positioning System (GPS) sensor, a compass sensor (or geomagnetic sensor) that detects a direction, or an inertial sensor that detects inertial force and provides various information, such as an acceleration, a speed, a direction, and a distance of a moving object to be detected. The first sensor unit 802 may detect a state of the first terminal 800, generates a signal corresponding to the detection, and transmits the generated signal to the controller 840.

The first camera 803 may include a lens system that forms an optical image of a subject by allowing light incident from the outside to converge, an image sensor that converts the optical image to an electrical image signal or data and outputs the electrical image signal or data, and a driver that drives the image sensor according to a control of the first controller 840, and may further include a flash.

The first display unit 830 displays the image or data input from the first controller 840 on a screen. As the first display unit 830, a Liquid Crystal Display (LCD), a touch screen or the like may be used. For example, the first display unit 830 may be a touch screen in, for example, a resistive type, a capacitive type, an infrared type, an acoustic wave type, an ElectroMagnetic (EM) type, an ElectroMagnetic Resonance (EMR) type, or a combination of the types. The first display unit 830 displays an image according to a control of the first controller 840 and generates a key contact interrupt when a user input means, such as a finger or a stylus pen, contacts a surface of the first display unit 830, and outputs user input information including an input coordinate and an input state to the first controller 840 according to a control of the first controller 840.

The first display unit 830 may provide user interfaces corresponding to various services (for example, a call, data transmission, broadcasting, and photographing a picture/video) to the user. The first display unit 830 transmits user input information corresponding to at least one touch input into the user interface to the first controller 840. The first display unit 830 may receive at least one touch through a user's body (for example, fingers) or a touchable input means (for example, a stylus pen). The touch is not limited to the contact between the first display unit 830 and the user's body or the touchable input means, and may include a non-contact hover (for example, when a detectable interval between the first display unit 830 and the user's body or the touchable input means is greater than 0 and less than or equal to 5 cm). The detectable interval may be larger according to a hovering detection capability of the first display unit 830. The first communication unit 870 is provided for a direct connection with a counterpart terminal or a connection with a counterpart terminal through the network, and may be a wired or wireless communication unit. The first communication unit 870 transmits data from the first controller 840, the first memory 860, or the first camera 803 through a wired cable or wirelessly. Alternatively, the communication unit 870 receives data from an external communication line or the air through a wired cable or wirelessly to transmit the data to the first controller 840 or store the data in the first memory 860.

The first communication unit 870 may include a mobile communication module, a wireless LAN (Local Area Network) module, or a short distance communication module. The first communication unit 870 may include an Integrated Services Digital Network (ISDN) card, a modem, a LAN card, an infrared port, a Bluetooth port, a Zigbee port, or a wireless port, but is not limited thereto. The short distance communication module may wirelessly perform short distance communication with a counterpart terminal according to a control of the first controller 840. A short distance communication scheme may include Bluetooth, WiFi-Direct communication, Near Field Communication (NFC), Infrared Data Association (IrDA) communication and the like.

The first memory 860 may store data for driving at least one voice recognition application, a schedule management application, a document making application, a music application, an Internet application, a map application, a camera application, an e-mail application, an image editing application, a search application, a file search application, a video application, a game application, a Social Network Service (SNS) application, a phone application, and a message application. The first memory 860 may store images for providing a user interface related to at least one application, user information, data or database such as a document, background images (menu screen, idle screen and the like) or operating programs required for driving the first terminal 800, and images photographed by a camera. The first memory 860 is a machine (for example, computer)-readable medium and the term, "machine-readable medium," may be defined as a medium that provides data to the machine so that the machine may perform a specific function. The machine-readable medium may be a storage medium. The first memory 860 may include a non-volatile medium and a volatile medium. All of these media should be tangible such that commands transferred by the media can be detected by a physical instrument such as the machine reading the commands.

The first memory 860 stores a plurality of contacts information including contacts information of an owner of the first terminal 800. The plurality of contacts information may be included in a general telephone directory or user information database of a particular application. Each contact information may include at least one identification information such as a name of the contact, a phone number, a web address, a URL, an e-mail address, a Social Network Service (SNS) ID, a user account, a user ID, and a nickname through which users can be identified. The first memory 860 may store a list of applications supported by a counterpart terminal. The list of the applications supported by the counterpart terminal may be mapped with contacts information of the counterpart terminal, and may be included in contacts information or stored as a separate database or table.

The first controller 840 executes an application according to input information and the application performs a program operation according to the input information. The input information may be an input through the first input/output module 801, the first display unit 830, the first sensor unit 802, the first communication unit 870, or the first camera 803. The first controller 840 may include a bus for information communication and a processor connected with the bus for information processing. The first controller 840 may include a Central Processing Unit (CPU), an Application Processor (AP), a communication processor or the like.

The first controller 840 may further include a Random Access Memory (RAM) connected with the bus to temporarily store information required by the processor and a Read Only Memory (ROM) connected with the bus to store static information required by the processor.

The first controller 840 controls general operations of the first terminal 800 and performs the P2P service using the contacts information.

Specifically, the first controller 840 performs general control operations of the first terminal 800 and allocates messages to the first advertisement message processor 810, the first application search processor 820, and the first application execution processor 850 according to types of messages received through the first communication unit 870. Further, the message is displayed on the first display unit 830 according to a processing result of each processor or as information stored in the first memory 860 is updated. The first controller 840 establishes and maintains a connection between the first terminal 800 and at least one counterpart terminal.

The first advertisement message processor 810 generates an advertisement message including contacts information of the first terminal 800 and transmits the generated advertisement message to a neighboring counterpart terminal through the first communication unit 870. The first advertisement message processor 810 receives an advertisement response message to the advertisement message through the first communication unit 870. The advertisement response message includes contacts information of the owner of the counterpart terminal.

The first application search processor 820 may transmit a search app message to the counterpart terminal through the first communication unit 870, and the search app message may include a search request for an application installed in the counterpart terminal and identification information of the application to be searched for. For example, the first application search processor 820 may transmit a search app message including identification information of at least one application within the first terminal 800 to use the P2P service to the counterpart terminal. The first application search processor 820 receives a search app response message to the search app message from the counterpart terminal through the first communication unit 870. The search app response message may include an application search result, and the search result may include a list of applications enabling the P2P service, whether an application corresponding to received application identification information is installed (and/or executed), and detailed information (identification information and version) of the application.

The first controller 840 may control the first display unit 830 such that a list of counterpart terminals (or identification information or contacts information) having the corresponding applications installed therein according to respective applications or a list of applications installed in the corresponding terminals according to respective terminals is displayed in the contacts information or the application supporting the P2P service.

The first application execution processor 850 transmits an application execution request message which makes a request for executing an application to the counterpart terminal to perform an actual P2P service after a P2P session connection through the communication unit 870. The first application execution processor 850 controls the communication unit 870 to transmit a URL and allows the counterpart terminal to download or upgrade a particular application.

The first advertisement message processor 810, the first application search processor 820, and the first application execution processor 850 may be function modules included within the first controller 840 or applications loaded to the first memory 860 or the RAM. Accordingly, it may be considered that each of operations performed by the first advertisement message processor 810, the first application search processor 820, and the first application execution processor 850 is processed by the first controller 840.

Figure 2:
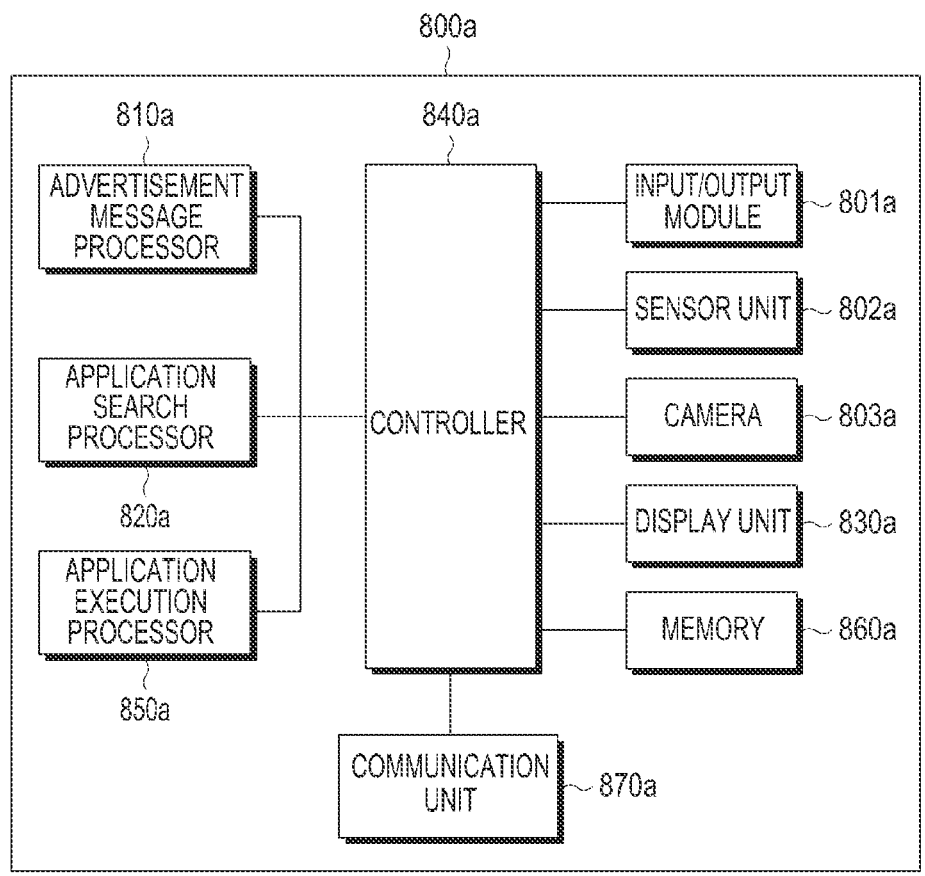
FIG. 2 illustrates a block diagram of a second terminal according to an embodiment of the present invention.

FIG. 2 illustrates a representative configuration of a second terminal according to an embodiment of the present disclosure. Since the second terminal 800a has the same or similar configuration to that of the first terminal 800, duplicate descriptions will be omitted. A detailed description of each component of the second terminal 800a may refer to the description of the corresponding component of the first terminal 800 using the same name except for an ordinal, and vice versa.

Referring to FIG. 2, the second terminal 800a corresponding to a counterpart terminal includes a second input/output module 801a, a second sensor unit 802a, a second camera 803a, a second advertisement message processor 810a, a second application search processor 820a, a second display unit 830a, a second controller 840a, a second application execution processor 850a, a second memory 860a, and a second communication unit 870a.

The second controller 840a controls general operations of the second terminal 800a and performs the P2P service using the contacts information.

Specifically, the second controller 840a performs general control operations of the second terminal 800a and allocates messages to the second advertisement message processor 810a, the second application search processor 820a, and the second application execution processor 850a according to types of messages received through the second communication unit 870a. Further, the message is displayed on the second display unit 830a according to a processing result of each processor or as information stored in the second memory 860a is updated. The second controller 840a establishes and maintains a connection between the second terminal 800a and the first terminal 800.

The second advertisement message processor 810a receives an advertisement message including contacts information of an owner of the first terminal 800 from the first terminal 800 through the second communication unit 870a. The advertisement message processor 810 generates an advertisement response message to the advertisement message and transmits the generated advertisement response message to the first terminal 800 through the second communication unit 870a. The advertisement response message may include contacts information of an owner (or second user) of the second terminal 800a.

The second application search processor 820a receives a search app message from the first terminal 800 through the second communication unit 870a and searches for an application installed in the second terminal 800a requested by the first terminal 800. For example, the second application search processor 820a may identify whether an application corresponding to application identification information included in the search app message is installed. The second application search processor 820a receives a response message to the search app message from the counterpart terminal through the first communication unit 870. The search app response message may include an application search result, and the search result may include a list of applications enabling the P2P service and whether an application corresponding to received application identification information is installed (and/or executed).

The second controller 840a may control the second display unit 830a such that the identification information (or contacts information) of the first terminal 800 or the application list of the first terminal 800 is displayed in the contacts information of the first terminal 800 or the application supporting the P2P service.

The second application execution processor 850a receives an application execution request message from the first terminal 800 through the second communication unit 870a after a P2P session connection. The application execution request message may include only a simple execution request or identification information of the application which is requested to be executed. Alternatively, the application execution request message may include download/upgrade information (an address of a server providing/upgrading the application) of the application which is requested to be executed. The second application execution processor 850a may execute the corresponding application according to the application execution request. Specifically, the second application execution processor 850a may execute the application after downloading the corresponding application from the server providing/upgrading the application or upgrading the application.

The second advertisement message processor 810a, the second application search processor 820a, and the second application execution processor 850a may be function modules included within the second controller 840a or applications loaded to the second memory 860a or the RAM. Accordingly, it may be considered that each of operations performed by the second advertisement message processor 810a, the second application search processor 820a, and the second application execution processor 850a is processed by the second controller 840a.

Figure 3:
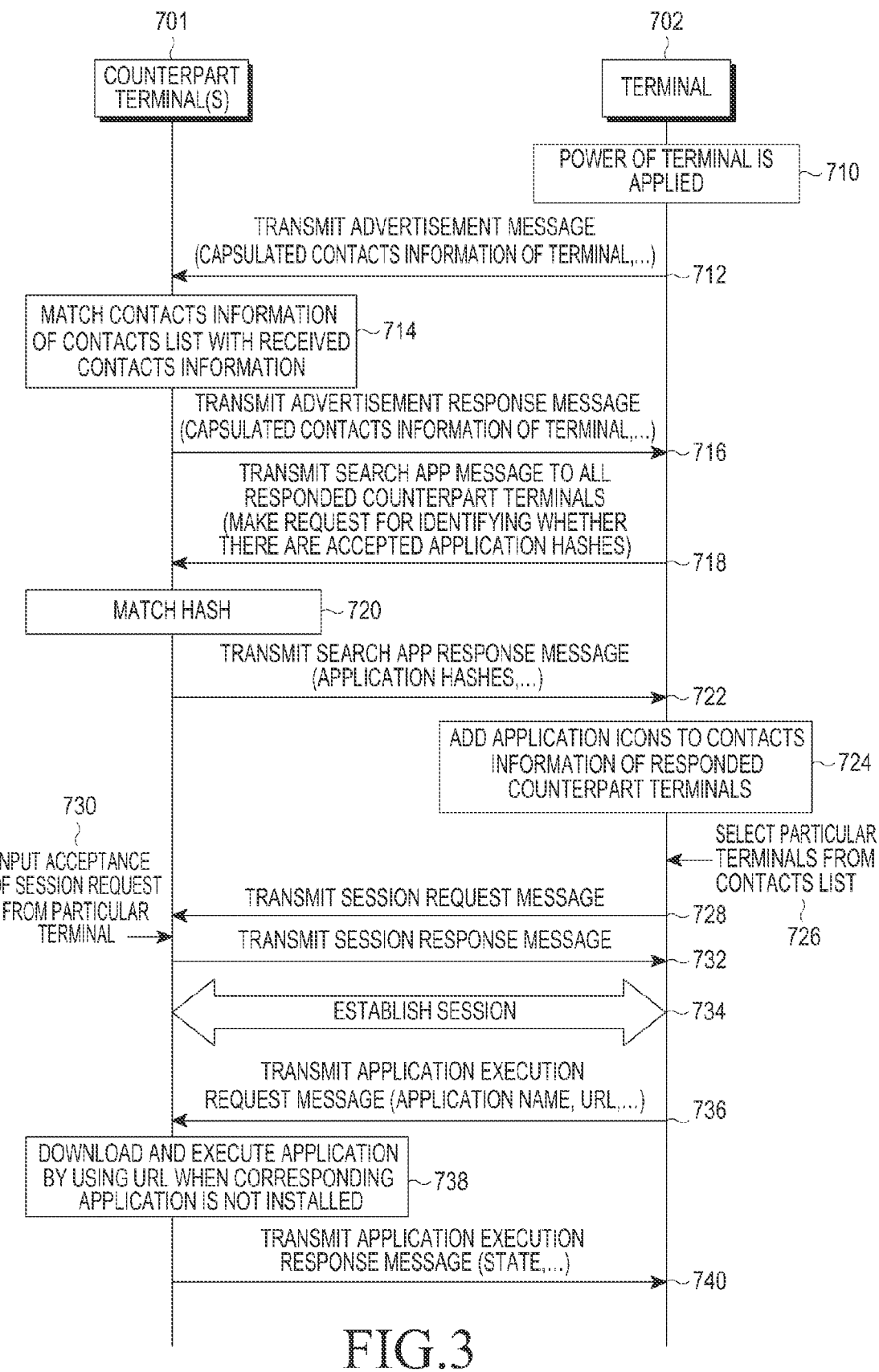
FIG. 3 is a flowchart illustrating a method of performing a P2P service by using contacts information according to an embodiment of the present invention.

FIG. 3 is a flowchart illustrating a method of performing the P2P service by using contacts information according to an embodiment of the present invention. The terminal may have a configuration as illustrated in FIG. 1, and the counterpart terminal may have a configuration as illustrated in FIG. 2. Further, it may be considered that operations performed by each of the terminals described below are performed by the controller of each of the terminals. At this time, the terminal may be referred to as a user terminal or a first terminal and the counterpart terminal may be referred to as a second terminal.

In FIG. 3, step S710 corresponds to a start step of initializing the P2P service in which the terminal may perform a P2P service initialization automatically or manually. The P2P service initialization corresponds to a preparation step for providing the P2P service and includes steps to an establishment of a session between a counterpart terminal 701 and a terminal 702.

For example, when power is applied and a contacts menu is executed in step 710, the terminal 702 starts the P2P service initialization. The terminal 702 may start the P2P service initialization according to an execution of a random application displaying the contacts information of the counterpart terminal 701 as well as the contacts menu.

Step 712 corresponds to an advertisement step in which the terminal 702 generates an advertisement message including the contacts information of the terminal 702 and transmits the generated advertisement message to at least one counterpart terminal 701 located near the terminal 702. At this time, the terminal 702 broadcasts the advertisement message to unspecific neighboring terminals. The contacts information is capsulated into the advertisement message and the capsulation refers to an operation of inserting the contacts information of the terminal 702 into a particular field of a preset message format. The contacts information may be a phone number, an e-mail address, or a Social Network Service (SNS) ID. In the present embodiment, it is assumed that the contact information is the phone number of the terminal.

Step S714 corresponds to a matching (or search) step of the contacts information in which the counterpart terminal 701 identifies whether a phone number included in the received advertisement message is stored in its own contacts list. The counterpart terminal 701 sequentially compares contacts information in the contacts list, such as a telephone directory stored in the memory, with the received contacts information and identifies contacts information that matches (corresponds to) the received contacts information.

Step S716 corresponds to an advertisement response step in which the counterpart terminal 701 transmits an advertisement response message including its own phone number to the terminal 702 when the matching of the contacts information is successful. When the matching of the contacts information fails, the counterpart terminal 701 may or may not transmit an advertisement response message including information on the matching failure of the contacts information to the terminal 702. Further, the counterpart terminal 701 may transmit the advertisement response message to the terminal 702 whether the matching of the contacts information is successful or not. In order to inform that the advertisement response message is a response to a particular advertisement message, the advertisement response message may include a message identifier, contacts information, and a terminal identifier included within the particular advertisement message.

Step S718 corresponds to an application search request step in which the terminal 702 generates a search app message including identification information of at least one application supporting the P2P service within the first terminal 702 and transmits the generated search app message to all counterpart terminals 701 having transmitted the advertisement response message. In the present embodiment, a hash value or a hash index of the application identification information is used for a quick search of the application. The hash value or the hash index has a fixed short length, and each of the terminals may store the hash value of the application identification information in the corresponding memory in advance or calculate the hash value by substituting the application identification information into a hash function.

Step S720 corresponds to an application search step in which the counterpart terminal 701 searches and identifies whether an application corresponding to the received application identification information is installed. In the present embodiment, the counterpart terminal 701 performs a hash matching and searches and identifies whether there is a hash value that matches an application hash included in the search app message in application hash values stored in the memory.

Step S722 corresponds to a search request response step in which the counterpart terminal 701 generates a search app response message including a search result and transmits the generated search app response message to the terminal 702. The search app response message may include the identified application hash values. Alternatively, the counterpart terminal 701 may transmit a list of the applications supporting the P2P service to the first terminal 702 without the application search request of the first terminal 702.

Step S724 corresponds to a step of displaying identification information of the counterpart terminal in which the terminal 702 displays a list of counterpart terminals (or identification information or contacts information) having corresponding applications installed therein according to respective applications or a list of applications installed in the corresponding counterpart terminals according to respective counterpart terminals in the contacts information or the application supporting the P2P service. In the present embodiment, the terminal 702 identifies applications of the counterpart terminal 701 having transmitted the search app response message and adds icons of the identified applications to the corresponding contacts information. The icon corresponds to identification information of the identified application and the identification information may be a text or another image indicating the application, as well as the icon. Alternatively, the terminal 702 displays an image, such as an icon, or a text through which the application cannot be identified. When the user selects the image or text through a touch gesture or a hovering gesture, the terminal 702 may separately display identification information of the application.

Step S726 corresponds to a step of selecting a terminal and/or application to receive the P2P service in which the terminal 702 detects the selection of the terminal and/or application to receive the P2P service by the user. In the present embodiment, the terminal 702 detects a selection by the user for a terminal which desires to perform the P2P service from a list of the contacts.

Step S728 corresponds to a session request step in which the terminal 702 generates a session request message making a request for establishing a session for the P2P service and transmits the generated session request message to the selected terminal. The session request message may include session identification information, such as a session ID, and the like.

Step S730 corresponds to a session request identifying step in which the counterpart terminal 701 notifies a session establishing request (or P2P service performing request) from the terminal 702 to the user and receives a user input indicating acceptance or rejection. For example, the counterpart terminal 701 may display a message window informing of the session establishing request and the message window may include an acceptance button and a rejection button. Alternatively, the counterpart terminal 701 may be set to automatically respond to the session establishing request.

Step S732 corresponds to a session request response step in which the terminal 701 generates a session request response message indicating acceptance or rejection of the user and transmits the generated session request response message to the terminal 702. The session request response message may include session identification information, such as a session ID, and the like.

Step S734 corresponds to a session establishing step in which a session between at least one counterpart terminal 701 having transmitted the session response message and the terminal 702 is established.

Step S736 corresponds to an application execution request step in which the terminal 702 generates an application execution request message of the application selected by the user in step 726 and transmits the generated application execution request message to the counterpart terminal 701. The application execution request message may include download/upgrade information of the application which is requested to be executed. In the present embodiment, the application execution request message may include identification information (for example, name) of the application requested to be executed and download information (for example, URL of the download server).

Step S738 corresponds to an application installation step in which, when the application displayed in the application execution request message is not installed in the counterpart terminal 701, the counterpart terminal 701 downloads the application by using the URL included in the application execution request message and executes the downloaded application.

Step S740 corresponds to an application execution request response step in which the counterpart terminal 701 generates a response message of the application execution request and transmits the generated application execution request response message to the terminal 702. The application execution request response message may include an execution result (or execution state) of the requested application. Thereafter, the terminal 702 and the counterpart terminal 701 perform the P2P service through the application. The P2P service may include a service of transmitting data, such as a multimedia content, a file, streaming data, game data.

Although the present embodiment describes that the application execution request is made after the session is established, the application execution request may be made before or while the session is established. For example, the session request message may include the application execution request or the counterpart terminal 701 may automatically execute the corresponding application according to the reception of the session request message. FIGS. 4 to 9 are views describing a method of performing the P2P service by using contacts information according to various embodiments of the present invention.

Figure 4:
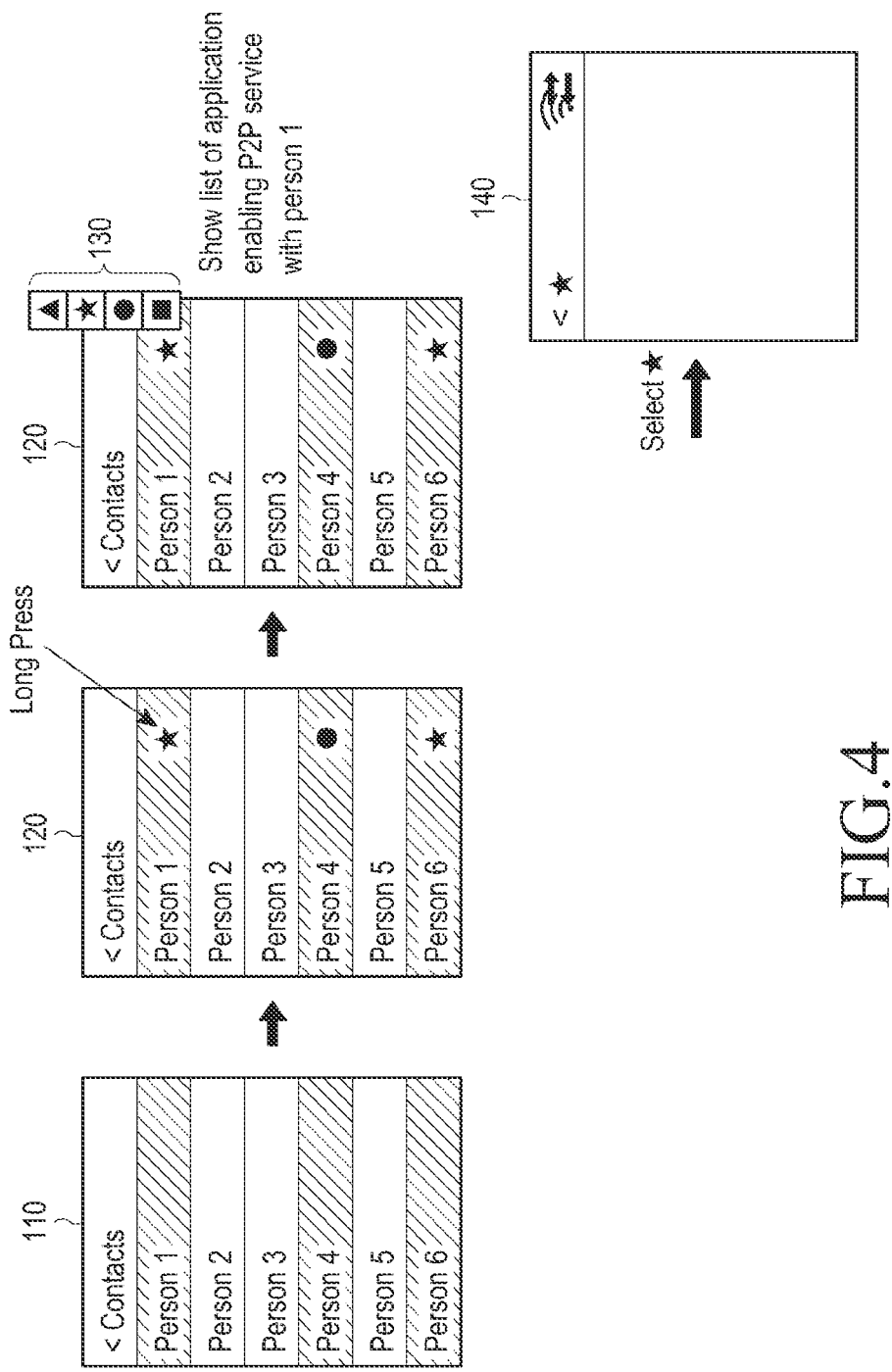
FIGS. 4 to 8, 9A and 9B are views describing a method of performing a P2P service by using contacts information according to various embodiments of the present invention.

FIG. 4 shows UIs displayed on the first display unit 830 of the first terminal 800. In the present embodiment, the P2P service is performed using a contacts list 110.

Referring to FIG. 4, the contacts list 110 having a plurality of contacts is displayed. For example, the user may select a contacts menu of a phone application and the contacts list 110 stored in the first memory may be displayed according to the selection of the menu. In the contacts list 110, contacts are arranged and displayed according to each of the names (Person1, Person2, . . . , Person6).

For example, when the user selects a contacts menu of the phone application, contacts supporting the P2P service may be displayed in a de-emphasized state. When the user selects an upper item (that is, "<Contacts") of the contacts list 110, contacts supporting the P2P service (Person1, Person4, and Person6) are highlighted. Such an emphasis may be performed by controlling item brightness, item color, item edge color, or a font size.

For example, when the user selects an upper item (that is, "<Contacts") of the contacts list 110, an icon indicating at least one application supporting the P2P service may be displayed next to a name of the highlighted contacts in the terminal of the corresponding contacts.

For example, as shown in contacts list 120 of FIG. 4, an icon (indicated by "★") of the application supporting the P2P service among applications installed in the terminal of "Person1" is displayed next to "Person1". For example, when a plurality of applications supporting the P2P service are installed in the terminal of "Person1", if a user's selection (for example, by a long press) for "Person1" or icon "★" displayed next to "Person1" is detected, the first terminal 100 may display icons 130 for a plurality of applications supporting the P2P service. Thereafter, when the user selects one (for example, application icon "★") of the plurality of icons 130 or selects one application supporting the P2P service installed in the terminal of "Person1", the first terminal 100 transmits a message making a request for executing an application corresponding to the application icon "★" to the terminal of "Person1". When the first terminal 800 receives an acceptance of the request message from the terminal of "Person1", the first terminal 800 performs the P2P service through a corresponding application screen 140 with the terminal of "Person1".

Figure 5:
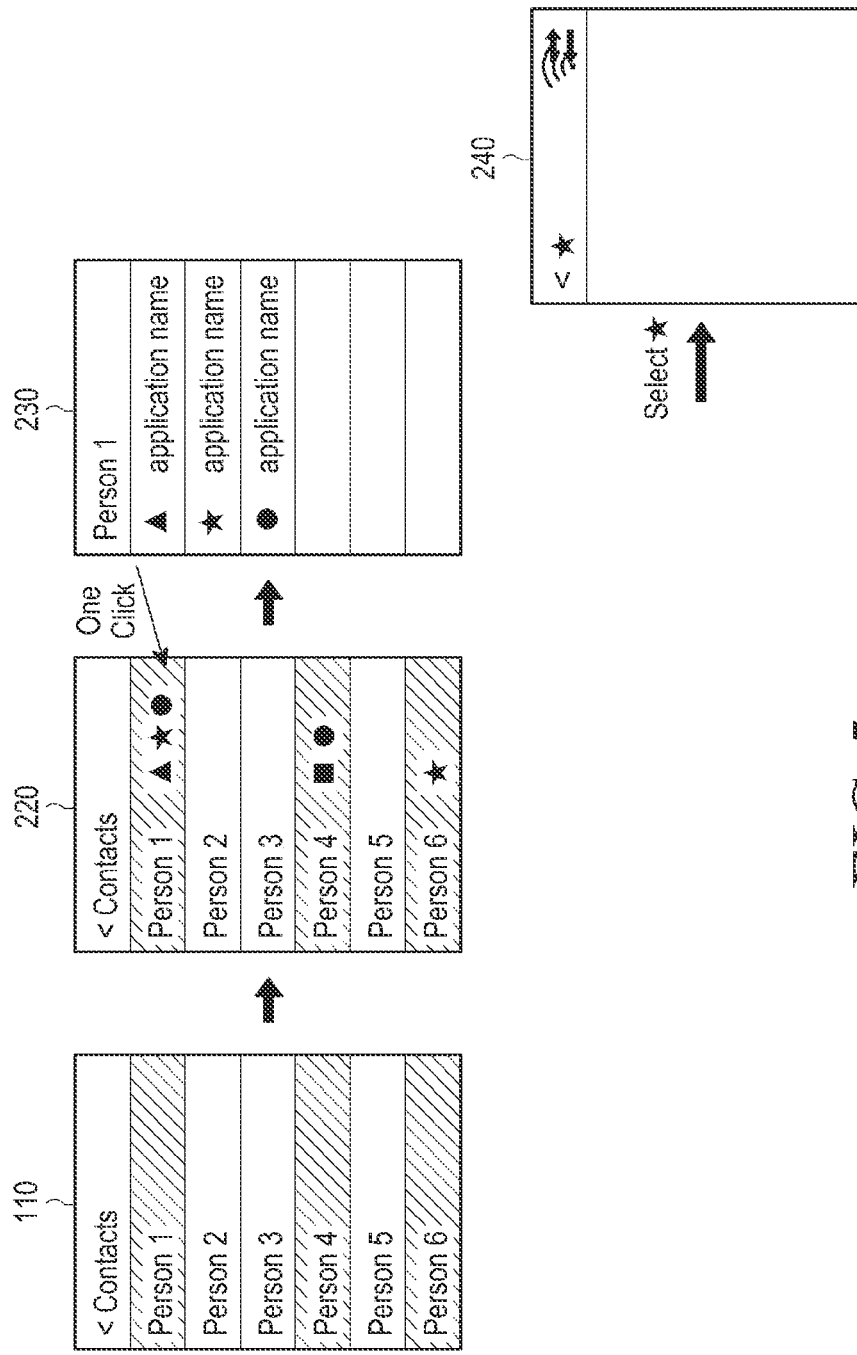

Referring to FIG. 5, for example, when the user selects a contacts menu of the phone application, contacts supporting the P2P service may be displayed in a de-emphasized state. When the user selects an upper item (that is, "<Contacts") of the contacts list 110, contacts supporting the P2P service (Person1, Person4, and Person6) may be highlighted.

In an updated contacts list 220, icons indicating all applications supporting the P2P service supported by terminals of corresponding contacts are displayed next to names of the highlighted contacts, respectively. At this time, when a user's selection (for example, one click) for "Person1" or the application icon "★" of the icons displayed next to "Person1" is detected, the first terminal 800 may display a window 230 having icons for a plurality of applications supporting the P2P service. Thereafter, when the user selects one (for example, application icon "★") of the plurality of icons, the first terminal 800 transmits a message making a request for executing an application corresponding to the application icon "★" to the terminal of "Person1". When the first terminal 800 receives an acceptance of the request message from the terminal of "Person1", the first terminal 800 performs the P2P service through a corresponding application screen 240 with the terminal of "Person1".

Figure 6:
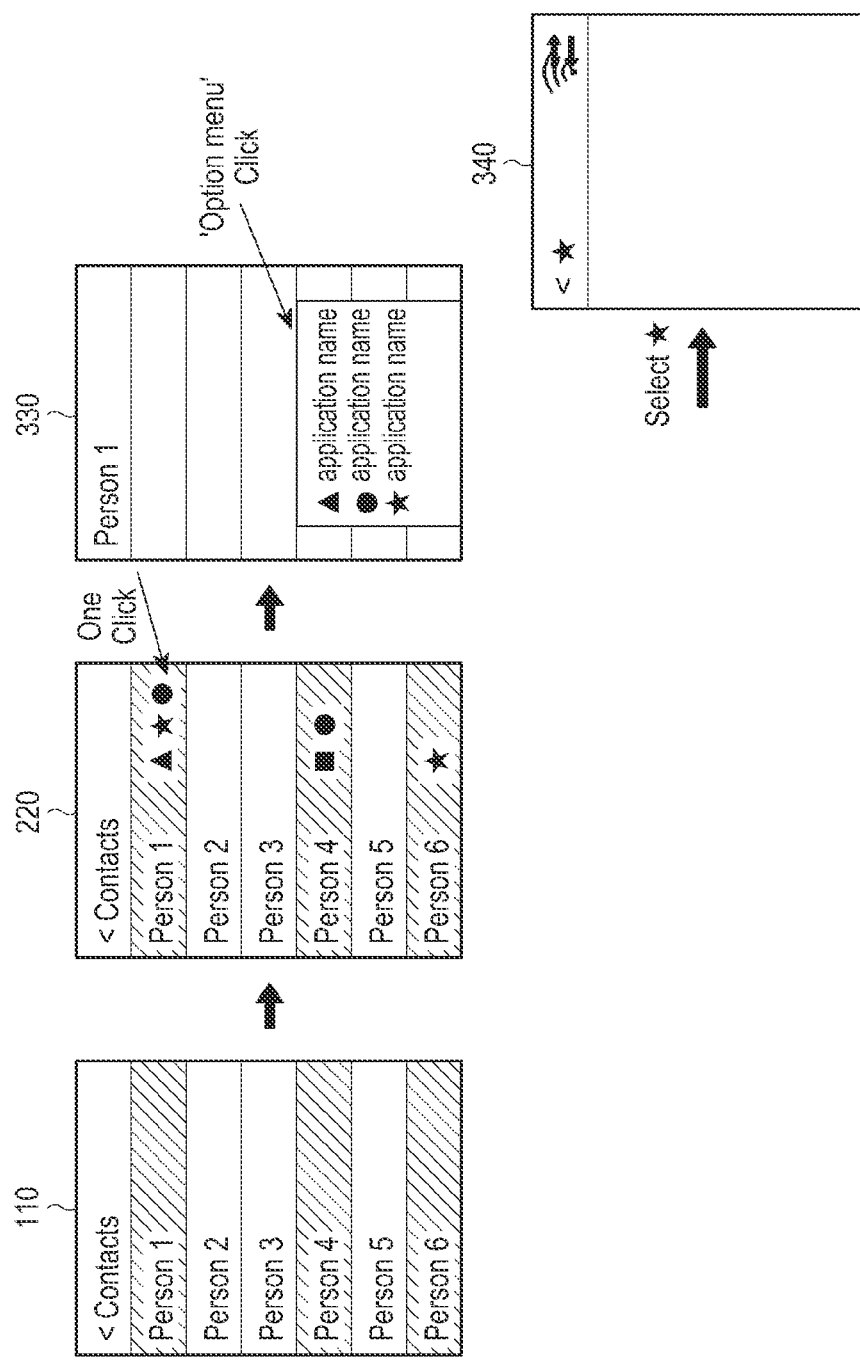

Referring to FIG. 6, for example, when the user selects a contacts menu of the phone application, contacts supporting the P2P service may be displayed in a de-emphasized state. When the user selects an upper item (that is, "<Contacts") of the contacts list 110, contacts supporting the P2P service (Person1, Person4, and Person6) may be highlighted.

In an updated contacts list 220, icons indicating all applications supporting the P2P service supported by terminals of corresponding contacts are displayed next to names of the highlighted contacts, respectively. At this time, when a user's selection (for example, one click) for "Person1" is detected, a window 330 showing detailed contacts information (name, phone number, e-mail address and the like) of "Person1" may be displayed. When the user selects an option menu within the window 330, icons and names of the plurality of applications supporting the P2P service installed in the terminal of "Person1" are displayed. Thereafter, when the user selects one (for example, application icon "★") of the plurality of icons, the first terminal 800 transmits a message making a request for executing an application corresponding to the application icon "★" to the terminal of "Person1". When the first terminal 800 receives an acceptance of the request message from the terminal of "Person1", the first terminal 800 performs the P2P service through a corresponding application screen 340 with the terminal of "Person1".

Meanwhile, the contacts menu according to an embodiment of the present invention further provides a screen in which a contacts group can be generated and managed, in order to integrally manage contacts information for each application.

Figure 7:
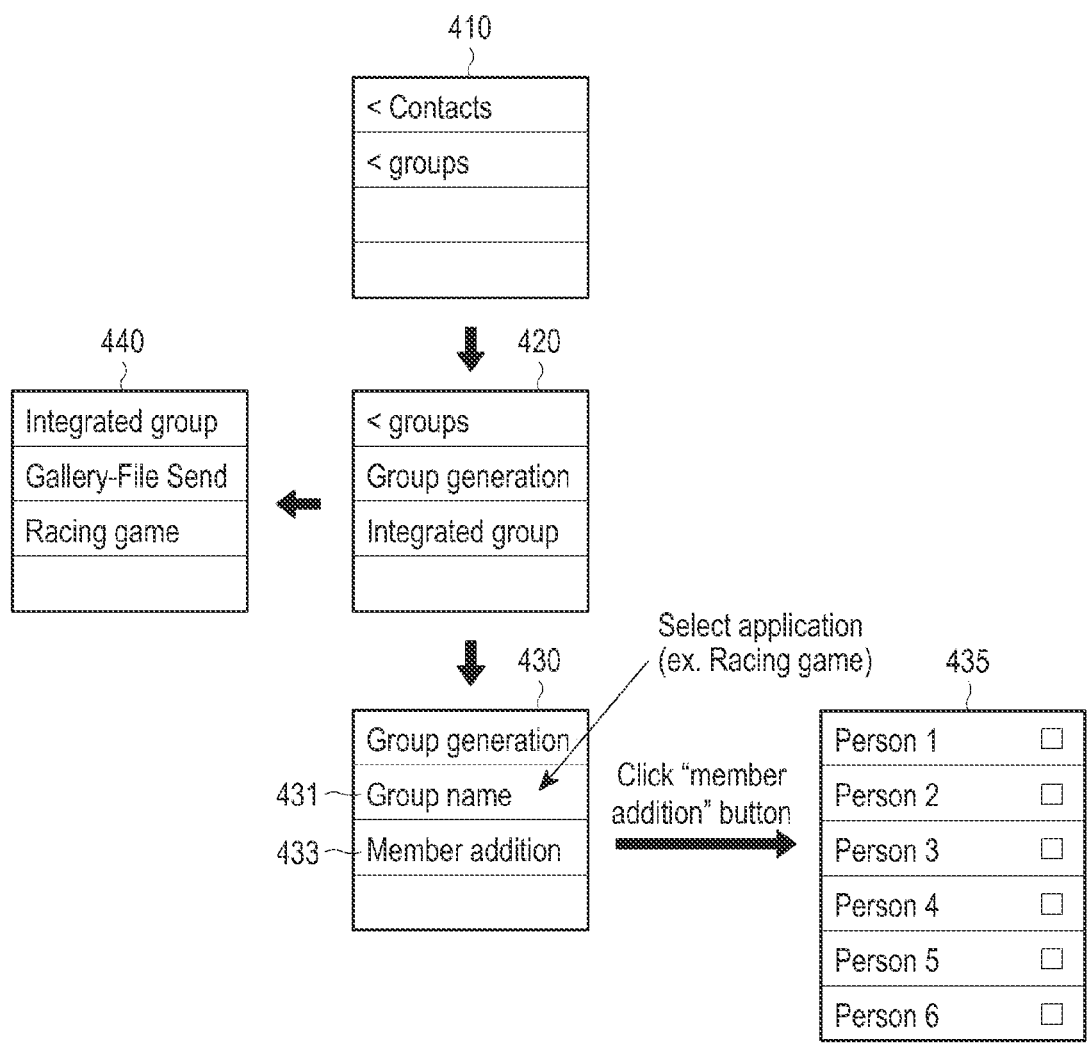

Referring to FIG. 7, when the user selects a group menu ("groups") on a contacts menu screen 410, the first terminal 800 displays a group menu screen 420 including a "group generation" menu and an "integrated group" menu.

When the group generation menu is first executed, the first terminal 800 displays a group generation screen 430 including a group name menu 431 and a member addition menu 433. The group name menu 431 provides a function which can select one of the applications supporting the P2P service installed in the first terminal 800. For example, when the user selects an application "Racing game" from the group name menu 431 and the member addition menu 433, a screen 435 displaying a list of contacts enabling the P2P service through the application "Racing game" among the stored list of contacts is provided. When a check box next to the corresponding contacts name is selected on the provided screen 435, a group "Racing game" is generated and stored in the "integrated group" menu.

Thereafter, when the integrated group menu is executed, an integrated group screen 440 displays a list of groups generated according to respective applications.

Accordingly, when the user selects, for example, "Racing game" on the integrated group screen 440, the first terminal 800 transmits a message making a request for executing "Racing game" to each of the contacts stored in the "Racing game" group.

The above description has been made based on a case where the application supported by a terminal having particular contacts is identified and the P2P service for the identified application is requested, but the following description will be made based on a case where contacts information supporting a particular application is identified and the P2P service is requested.

Figure 8:
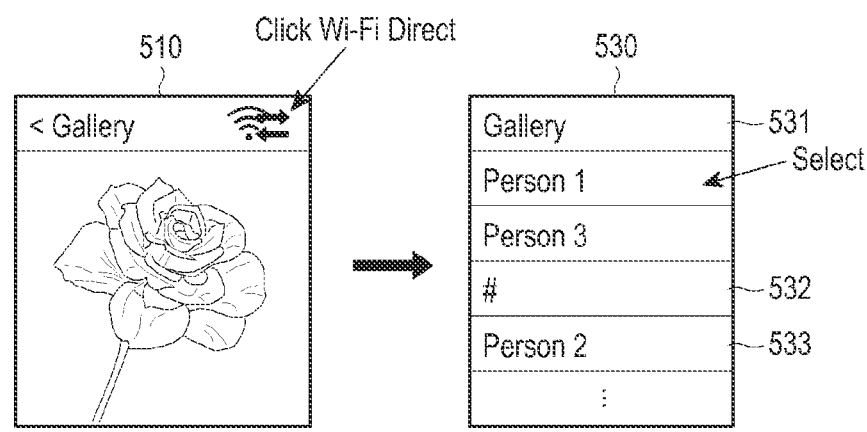

FIG. 8 illustrates an example of a screen which displays, when an application executable by the P2P service is executed, information on a terminal supporting the corresponding application based on contacts information.

First, it is assumed that a "Gallery" application is executed. The "Gallery" application provides a function by which a screen displayed on the terminal can be shared with screens of counterpart terminals connected through the P2P service. A button indicating one of the P2P services supported by the "Gallery" application is displayed on an upper part of a "Gallery" application screen 510. In FIG. 8, it is assumed that "Wi-Fi Direct" among the P2P services is supported.

For example, when the user clicks a "Wi-Fi Direct" button, the first terminal 800 displays a list 530 of contacts supporting the P2P service, and the list 530 separates a list 531 of terminals having installed the "Gallery" application and a list 533 of terminals which have not installed the "Gallery" application by using a separator 532, and displays the separated lists.

For example, when the user selects "Person1" from the list 531 of the terminals having installed the "Gallery" application, the first terminal 800 transmits an ID of the "Gallery" application and a message making a request for executing the "Gallery" application to the terminal of "Person1". Thereafter, when the first terminal 800 receives a response of the request message from the terminal of "Person1", the first terminal 800 performs the P2P service through the "Gallery" application with the terminal of "Person1".

For example, when the user selects "Person2" from the list 533 of the terminals which have not installed the "Gallery" application, the first terminal 800 transmits a Uniform Resource Locator (URL) from which the "Gallery" application can be installed and a message making a request for executing the application to the terminal of "Person2". When a user of "Person2" having received the URL installs the "Gallery" application and transmits a response to the request message to the terminal, the terminal can perform the P2P service through the "Gallery" application with the terminal of "Person2".

Figure 9A:
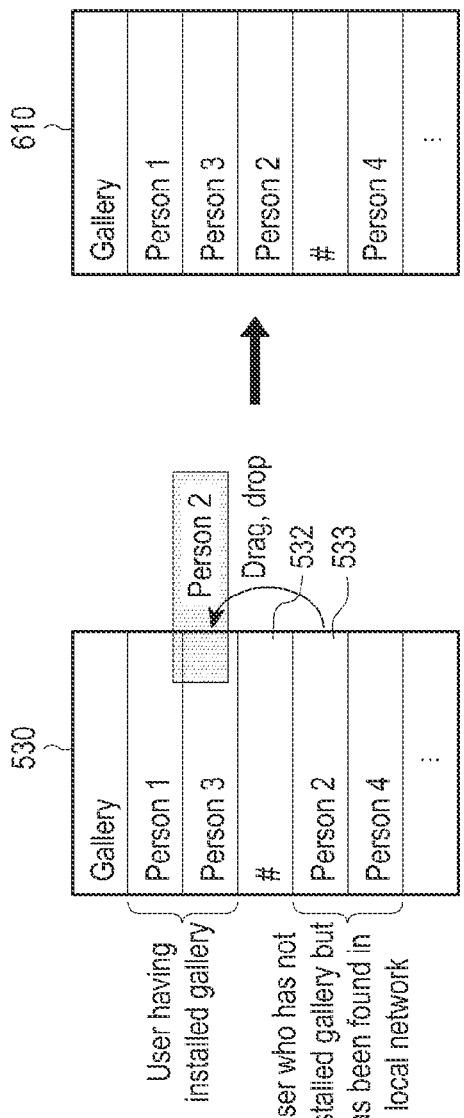
Figure 9B:
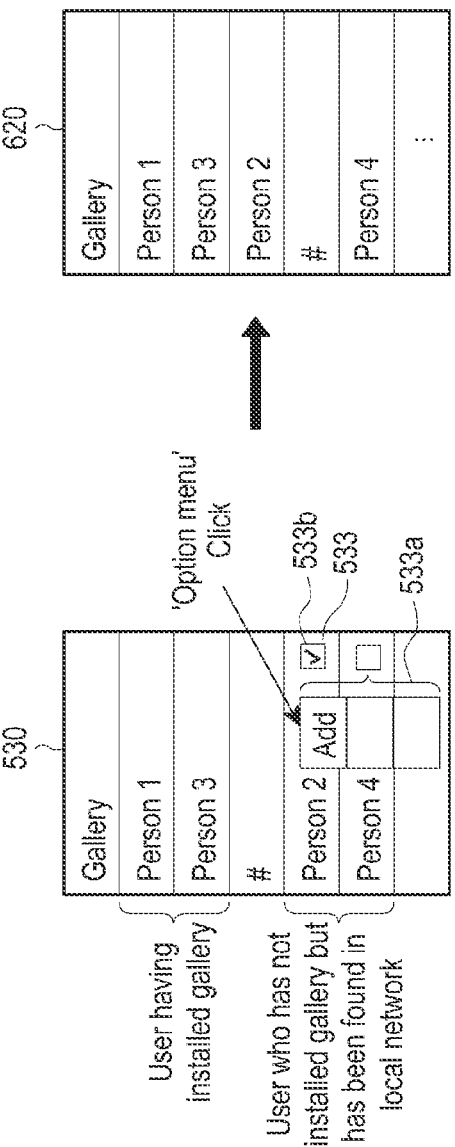

FIGS. 9A and 9B illustrate an example of a screen in which the contacts list of FIG. 8 is set.

The contacts list 530 may be displayed while being distinguished according to whether the "Gallery" application is installed. When "Person2" is moved to the list 531 of the terminals which have installed the "Gallery" application from the list 533 of the terminals which have not installed the "Gallery" application, the first terminal 100 transmits the URL to the terminal of Person2. Hereinafter, various operations for moving Person2 will be described.

First, referring to FIG. 9A, when "Person2" is "dragged and dropped", Person2 is moved to a contacts list of the terminals having installed the "Gallery" application as shown in an updated contacts list 610.

In another example, referring to FIG. 9B, when "Person2" is selected, an option menu 533a is displayed. When an "addition" item of the option menu 533a is selected, a check box 533b is displayed next to a name of "Person2". When the check box 533b is selected, "Person2" is moved to the contacts list of the terminals having installed the "Gallery" application as shown in the updated contacts list 620.

Figure 10:
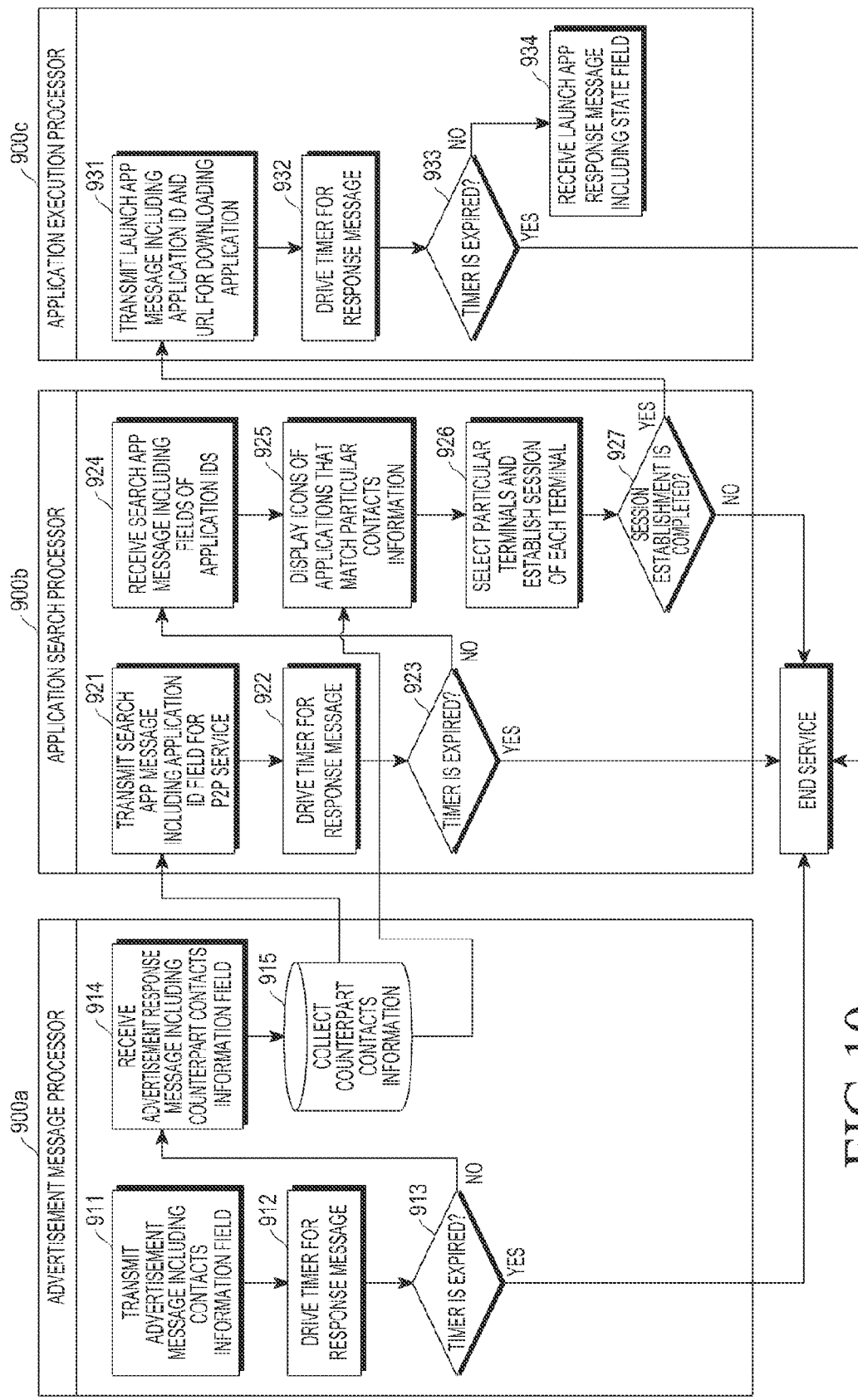
FIG. 10 is a flowchart illustrating a method of performing a P2P service by using contacts information according to another embodiment of the present invention.

FIG. 10 is a flowchart illustrating a method of performing the P2P service by using contacts information according to another embodiment of the present invention. The method is performed by a user terminal and a structure of the user terminal is similar to that illustrated in FIG. 1.

The user terminal performs the P2P service by controlling an advertisement message processor 900a, an application search processor 900b, and an application execution processor 900c. Hereinafter, a flow of operations of the user terminal according to a control of each processor will be described in detail.

In step 911, the advertisement message processor 900a transmits an advertisement message including a contacts information field of the user to a counterpart terminal.

In step 912, the advertisement message processor 900a drives a timer for a response message. The timer may be counted from a time when the advertisement message is transmitted to a threshold time (for example, one minute).

In step 913, the advertisement message processor 900a determines whether the timer has expired. The advertisement message processor 900a ends the P2P service when the timer has expired and performs step 914 when the timer has not expired.

In step 914, the advertisement message processor 900a receives a response message including a contacts information field of a counterpart.

In step 915, the advertisement message processor 900a identifies the received response message and collects counterpart contacts information.

In step 921, the application search processor 900b transmits a search app message including an application ID field for the P2P service to a counterpart terminal corresponding to the counterpart contacts information collected in step 915.

In step 922, the advertisement search processor 900b drives a timer for a response message.

In step 923, the advertisement search processor 900b determines whether the timer has expired. The advertisement search processor 900b ends the service when the timer has expired and performs step 924 when the timer has not expired.

In step 924, the application search processor 900b receives a search app response message including fields of application IDs.

In step 925, the application search processor 900b displays icons of applications that match particular contacts information included in the received search app response message.

In step 926, the application search processor 900b selects particular terminals according to a selection of the icon by the user and establishes a session for each terminal.

In step 927, the advertisement search processor 900b determines whether the session is completely established. The application search processor 900b ends the P2P service when the session is not completed, and informs the application execution processor 900c of the session completion when the session establishment is completed.

In step 931, the application execution processor 900c recognizes that the session establishment is completed and transmits a launch app message (that is, application execution request message) including an application ID and a URL for downloading the application.

In step 932, the advertisement execution processor 900c drives a timer for a response message.

In step 933, the advertisement execution processor 900c determines whether the timer has expired. The advertisement execution processor 900c ends the P2P service when the timer has expired and performs step 934 when the timer has not expired.

In step 934, the application execution processor 900c receives a launch app response message including a state field for indicating an execution state of the application.

Figure 11:
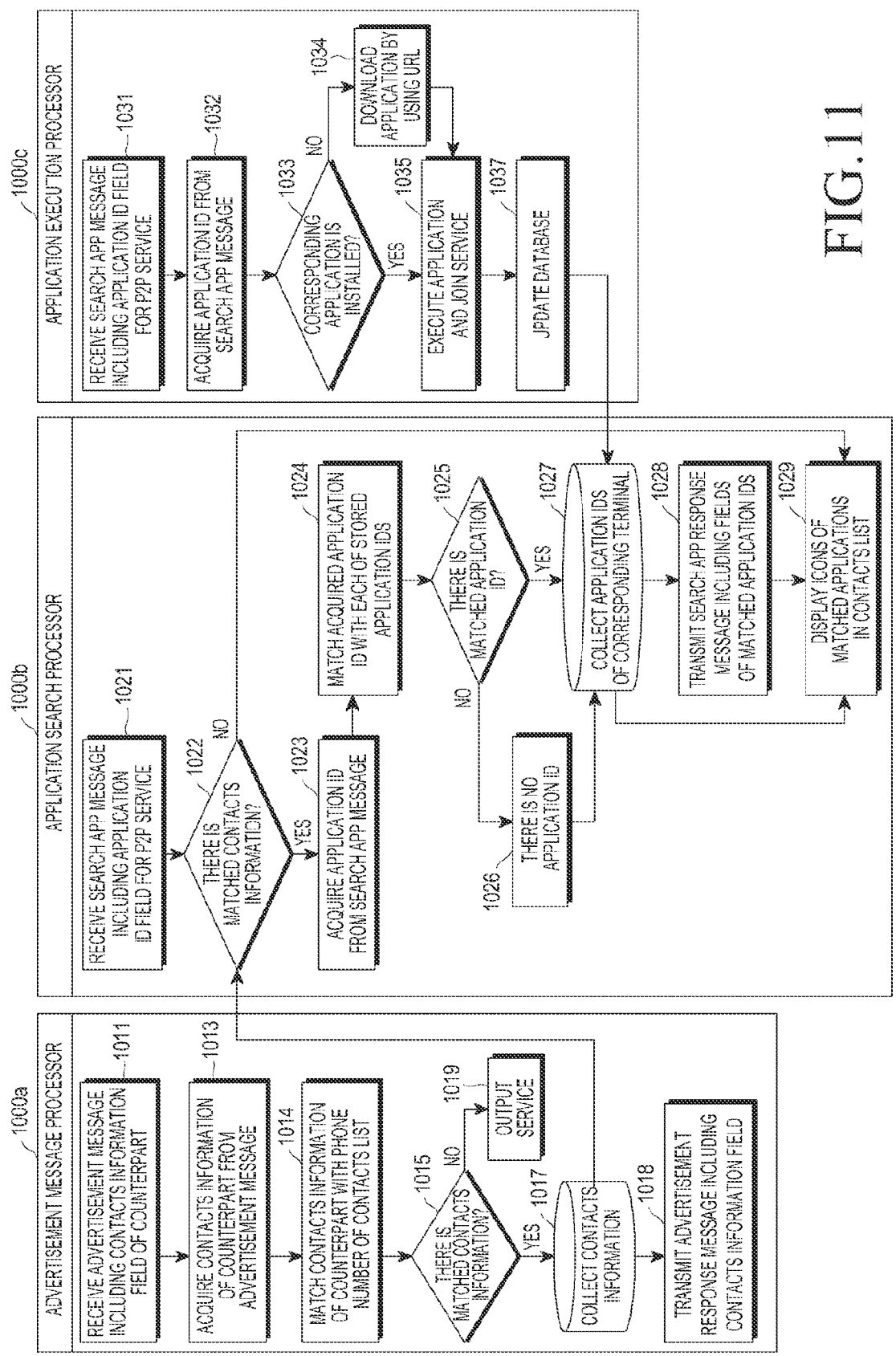
FIG. 11 is a flowchart illustrating a method of performing a P2P service by using contacts information according to another embodiment of the present invention.

FIG. 11 is a flowchart illustrating a method of performing the P2P service by using contacts information according to another embodiment of the present invention. The method is performed by a counterpart terminal and a structure of the counterpart terminal is similar to that illustrated in FIG. 2.

The counterpart terminal performs the P2P service by controlling an advertisement message processor 1000a, an application search processor 1000b, and an application execution processor 1000c. Hereinafter, a flow of operations of the counterpart terminal according to a control of each processor will be described in detail.

In step 1011, the advertisement message processor 1000a receives an advertisement message including a contacts information field of the user terminal.

In step 1013, the advertisement message processor 1000a acquires contacts information of a counterpart from the advertisement message.

In step 1014, the advertisement message processor 1000a matches phone numbers of the contacts list with the contacts information of the counterpart.

In step 1015, the advertisement message processor 1000a determines whether there is matched contacts information. The advertisement processor 1000a performs step 1017 when there is matched contacts information, and performs step 1019 when there is no matched contacts information.

In step 1017, the advertisement message processor 1000a collects the matched contacts information.

In step 1018, the advertisement message processor 1000a transmits an advertisement response message including a contacts information field.

In step 1019, the advertisement message processor 1000a ends the service.

In step 1021, the application search processor 1000b receives a search app message including an application ID field for the P2P service.

In step 1022, the application search processor 1000b determines whether there is contacts information that matches contacts information of the terminal having transmitted the search app message in the collected contacts information. The application search processor 1000b performs step 1029 when there is no matched contacts information, and performs step 1023 when there is matched contacts information. When there is no matched contacts information, the contacts list does not display a particular application in step 1029, but instead displays icons of matched applications. In step 1023, the application search processor 1000b acquires an application ID from the search app message.

In step 1024, the application search processor 1000b matches the acquired application ID with each of the stored application IDs.

In step 1025, the advertisement search processor 1000b determines whether there is a matched application ID. The application search processor 1000b performs step 1027 when there is a matched application ID In step 1026, if there is no matched application ID, in step 1027, the application search processor 1000b doesn't collect application IDs of the corresponding terminal. Meanwhile, when there is no application ID, the application ID of the corresponding terminal is not collected. The application search processor 1000b may display icons of the applications in step 1029 after collecting the application IDs in step 1027.

In step 1028, the application search processor 1000b transmits a search app response message including fields of the matched application IDs to the user terminal.

In step 1029, the advertisement search processor 1000b displays icons of the matched applications in the contacts list.

In step 1031, the application execution processor 1000c receives a launch app message including an application ID and a URL for downloading the application.

In step 1032, the application execution processor 1000c acquires the application ID and the URL from the received launch app message.

In step 1033, the advertisement execution processor 1000c determines whether the corresponding application is installed. The application execution processor 1000c performs step 1034 when the application is not installed, and performs step 1035 when the application is installed.

In step 1034, the application execution processor 1000c downloads the application by using the identified URL.

In step 1035, the advertisement execution processor 1000c executes the application and performs the P2P service.

In step 1037, the application execution processor 1000c maps the acquired application IDs according to respective contacts information and updates a database. Thereafter, in step 1027, the application search processor 1000b allows the updated database to be stored according to each application ID.

It may be appreciated that the embodiments of the present invention can be implemented in software, hardware, or a combination thereof. For example, the camera, the sensor unit, the memory, the communication unit, the display unit, and the controller in the terminal may be configured as individual devices. Any such software may be stored, for example, in a volatile or non-volatile storage device such as a Read Only Memory (ROM), a memory such as a Random Access Memory (RAM), a memory chip, a memory device, or a memory Integrated Circuit (IC), or a machine (for example, computer)-readable storage medium optically or magnetically recordable such as a Compact Disc (CD), a Digital Versatile Disc (DVD), a magnetic disk, or a magnetic tape, regardless of its ability to be erased or its ability to be re-recorded. It will be appreciated that a memory, which may be incorporated in an electronic device, may be an example of a machine-readable storage medium which is suitable for storing a program or programs including commands to implement the embodiments of the present invention. Accordingly, the present invention includes a program that includes a code for implementing an apparatus or a method defined in any claim in the specification and a machine-readable storage medium that stores such a program. Moreover, such a program may be electronically transferred through an arbitrary medium such as a communication signal transferred through a wired or wireless connection, and the present invention properly includes the equivalents thereof.

Further, the terminal may receive the program from a program providing apparatus connected to the terminal wirelessly or through a wire and store the received program. The program providing apparatus may include a memory that stores a program including instructions allowing the terminal to execute the method of performing the P2P service by using contacts information and information required for the method of performing the P2P service by using the contacts information, a communication unit that performs wired or wireless communication with the terminal, and a controller that transmits the corresponding program to the terminal according to a request of the terminal or automatically.

Although specific embodiments are described in the above description of the present invention, various modifications can be made without departing from the scope of the present invention. Accordingly, the scope of the present invention shall not be determined by the above-described embodiments, but is to be determined by the following claims and their equivalents.

What is claimed is:

1. A method of performing a Peer to Peer (P2P) service with at least one second terminal by a first terminal, the method comprising:
    transmitting contact information of the first terminal to the at least one second terminal;
    receiving, at the first terminal, contact information of the at least one second terminal from the at least one second terminal;
    transmitting, from the first terminal, to the at least one second terminal, a request message for confirming whether the at least one second terminal includes a same application as an application supporting the P2P service which is installed in the first terminal;
    receiving, at the first terminal, information on the same application supporting the P2P service from the at least one second terminal according to the request message;
    displaying, at the first terminal, identification information of the at least one second terminal and first identification information of the same application by using the contact information of the at least one second terminal and the information on the same application; and
    performing, at the first terminal, the P2P service with the at least one second terminal through the same application.

2. The method of claim 1, further comprising transmitting second identification information of the same application supporting the P2P service to the at least one second terminal.

3. The method of claim 2, wherein the second identification information corresponds to a hash value.

4. The method of claim 1, wherein the information on the same application received from at least one second terminal includes information on whether the same application is installed.

5. The method of claim 1, further comprising:
    detecting a user's selection for the identification information of at least one second terminal or the first identification information; and
    establishing a session with the at least one second terminal according to the user's selection.

6. The method of claim 5, wherein establishing the session comprises:
    transmitting a session establishment request message to the at least one second terminal; and
    receiving a response message of a session establishment request from the at least one second terminal.

7. The method of claim 1, further comprising transmitting a message making a request for executing the same application to the at least one second terminal.

8. The method of claim 7, wherein the message making the request for executing the same application includes the identification information of the same application or download information of the same application.

9. The method of claim 1, wherein displaying the identification information of the at least one second terminal and the first identification information of the same application comprises displaying a list of same applications supporting the P2P service and a list of second terminals having installed each of the same applications in the list.

10. The method of claim 1, wherein displaying the identification information of the at least one second terminal and the first identification information of the same application comprises displaying a list of second terminals supporting the P2P service and a list of same applications supporting the P2P service installed in each of the second terminals in the list.

11. A non-transitory machine-readable storage medium having recorded thereon a program for executing a method of performing a Peer to Peer (P2P) service with at least one second terminal by a first terminal, the method comprising:
transmitting contact information of the first terminal to the at least one second terminal;
receiving, at the first terminal, contact information of the at least one second terminal from the at least one second terminal;
transmitting, from the first terminal, to the at least one second terminal, a request message for confirming whether the at least one second terminal includes a same application as an application supporting the P2P service which is installed in the first terminal;
receiving, at the first terminal, information on the same application supporting the P2P service from the at least one second terminal according to the request message;
displaying, at the first terminal, identification information of the at least one second terminal and first identification information of the same application by using the contact information of the at least one second terminal and the information on the same application; and
performing, at the first terminal, the P2P service with the at least one second terminal through the same application.

12. A first terminal performing a Peer to Peer (P2P) service with at least one second terminal, the first terminal comprising:
a display unit;
a memory configured to store contact information of the first terminal;
a communication unit configured to directly perform wireless communication with at least one second terminal; and
a controller configured to:
transmit the contact information of the first terminal to the at least one second terminal through the communication unit;
receive contacts information of the at least one second terminal from the at least one second terminal through the communication unit;
transmit, to the at least one second terminal, a request message for confirming whether the at least one second terminal includes a same application as an application supporting the P2P service which is installed in the first terminal;
receive information on the same application supporting the P2P service from the at least one second terminal according to the request message, through the communication unit;
display identification information of the at least one second terminal and first identification information of the same application on the display unit by using the contact information of the at least one second terminal and the information on the same application; and
perform the P2P service with the at least one second terminal through the same application.

13. The first terminal of claim 12, wherein the controller transmits second identification information of the same application supporting the P2P service to the at least one second terminal through the communication unit.

14. The first terminal of claim 12, wherein the controller transmits a message making a request for executing the same application to the at least one second terminal through the communication unit.

15. A second terminal performing a Peer to Peer (P2P) service with a first terminal, the second terminal comprising:
a display unit;
a memory configured to store contact information of the second terminal;
a communication unit configured to directly perform wireless communication with the first terminal; and
a controller configured to:
receive contact information of the first terminal from the first terminal through the communication unit;
transmit the contact information of the second terminal to the first terminal through the communication unit;
receive a request message for confirming whether the second terminal includes a same application as an application supporting the P2P service which is installed in the first terminal through the communication unit;
transmit information on the same application supporting the P2P service to the first terminal through the communication unit; and
perform the P2P service with the first terminal through the same application.

16. The second terminal of claim 15, wherein the controller receives identification information of the same application supporting the P2P service from the first terminal through the communication unit.

17. The second terminal of claim 15, wherein the controller receives a message making a request for executing the same application from the first terminal through the communication unit.

* * * * *